United States Patent Office 3,110,714
Patented Nov. 12, 1963

3,110,714
3-(2-CYANOETHYL)-1-(5-NITROFURFURYLI-DENEAMINO)HYDANTOIN
George C. Wright, Norwich, N.Y., assignor to The Norwich Pharmacal Company, a corporation of New York
No Drawing. Filed Dec. 6, 1961, Ser. No. 157,551
1 Claim. (Cl. 260—240)

This invention relates to a new chemical compound 3 - (2-cyanoethyl) - 1 - (5 - nitrofurfurylideneamino)hydantoin represented by the formula:

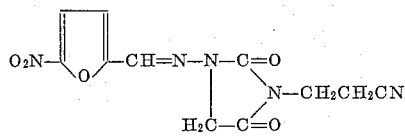

This new compound possesses a broad spectrum of antimicrobial activity. It is systemically active upon oral administration, particularly in the treatment of protozoal infections. For instance, coccidiosis of poultry, a very prevalent and costly disease if not checked, is effectively combatted by small amounts of this compound conveniently administered via the feed supply at a level of 0.011–0.022% by weight. Chickens infected with *Eimeria tenella* are spared from the morbidity and mortality accompanying this infection by providing to them a standard poultry diet containing as little as 0.011% by weight of this compound admixed in accordance with known methods such as tumbling, grinding and stirring.

In order that this invention may be readily available to and understood by those skilled in the art a method of making it is described:

To a mixture of 1-(5-nitrofurfurylideneamino)hydantoin, 167 g. (0.70 mole), and 700 ml. of dimethylformamide is added a solution of sodium, 1.0 g. (0.044 mole), in 200 ml. of ethanol, at 29–32° C. using mechanical stirring. Then a solution of acrylonitrile, 47 ml. (0.72 mole), in 200 ml. of ethanol is added dropwise to the mixture at 27–29° C. in 1 hour. The mixture is heated on the steam bath for 1¾ hrs., the resultant black solution is cooled in an ice bath, whereupon a yellow solid is deposited. The solid is collected and washed with five 20 ml. and five 30 ml. portions of ethanol, until the washings are nearly colorless. It is dried in an air oven at 65° C. The crude product, M.P. 195–200° C., weighs 154 g. (76%). It may be recrystallized from nitromethane or from acetonitrile. The yield of 1-(5-nitrofurfurylideneamino)hyantoin is 41.4 g., M.P. 209–211° C.

What is claimed is:
The chemical compound 3-(2-cyanoethyl)1-(5-nitrofurfurylideneamino)hydantoin represented by the formula:

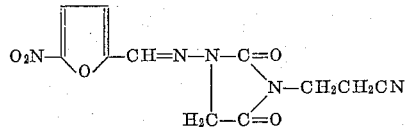

References Cited in the file of this patent
FOREIGN PATENTS
35–13927     Japan ------------------ Sept. 22, 1960

OTHER REFERENCES
Cyanamid "The Chemistry of Acrylonitrile," 2nd edition, 1959, pub. by American Cyanamid Co., pages 168–178.